United States Patent [19]
Hensley et al.

[11] Patent Number: 5,321,838
[45] Date of Patent: Jun. 14, 1994

[54] EVENT CAPTURING FOR COMPUTER SOFTWARE EVALUATION

[76] Inventors: Billy W. Hensley, 5513 Lake Hubbard Pkwy., Garland (Dallas County), Tex. 75043; Monty L. Hammontree, 2525 Preston Rd., #2213, Plano (Colling County), Tex. 75093

[21] Appl. No.: 662,305

[22] Filed: Feb. 28, 1991

[51] Int. Cl.$^5$ ............................................. G06F 11/00
[52] U.S. Cl. .................................... 395/700; 395/575; 364/DIG. 1; 364/264; 364/285; 364/286.1; 364/286.2; 364/242.4; 364/236.8; 364/948.2; 364/949.3; 364/921.8
[58] Field of Search ................... 340/709, 710, 707; 395/575, 700

[56] References Cited

U.S. PATENT DOCUMENTS

| | | | |
|---|---|---|---|
| 3,906,454 | 9/1975 | Martin | 364/DIG. 1 |
| 4,166,290 | 8/1979 | Furtman et al. | 364/DIG. 1 |
| 4,755,808 | 7/1988 | Bullock et al. | 340/709 |

OTHER PUBLICATIONS

'Personal Computing', Sep. 1989, pp. 109–117.
'CAS Proprietary Product', Messenger Text Search System for APS, v5, 1984.

Primary Examiner—Eddie P. Chan
Assistant Examiner—Kevin Spivak

[57] ABSTRACT

A method for evaluating application software used with a computer system having a graphic user interface. The method is implemented as a computer program that runs simultaneously with the application software. The program continually checks a system-provided event record to determine if a user-initiated event has occurred. If so, the program relates the event to an on-screen object of the graphic user interface and to the time at which it occurred. The program outputs an event capture log, which may be used for subsequent analysis.

5 Claims, 5 Drawing Sheets

|   | A | B | C | D |
|---|---|---|---|---|
| 1 | 1163504 | 15:59:46 | MouseDown | |
| 2 | 1163504 | 15:59:46 | About FullWrite... | |
| 3 | 1163516 | 15:59:46 | MouseUp | |
| 4 | 1163734 | 15:59:50 | MouseDown | |
| 5 | 1163734 | 15:59:50 | .. ile | |
| 6 | 1163776 | 15:59:50 | MouseUp | |
| 7 | 1164895 | 16:00:09 | MouseDown | |
| 8 | 1164956 | 16:00:10 | MouseUp | |
| 9 | 1165438 | 16:00:18 | MouseDown | |
| 10 | 1165438 | 16:00:18 | .. ype | |
| 11 | 1165502 | 16:00:19 | MouseUp | |
| 12 | 1165508 | 16:00:19 | MouseDown | |
| 13 | 1165508 | 16:00:19 | .. ype | |
| 14 | 1165520 | 16:00:19 | MouseUp | |
| 15 | 1165760 | 16:00:23 | MouseDown | |
| 16 | 1165760 | 16:00:23 | .. dit | |
| 17 | 1165844 | 16:00:25 | MouseUp | |
| 18 | 1165975 | 16:00:27 | MouseDown | |
| 19 | 1165975 | 16:00:27 | .. tyle | |
| 20 | 1166407 | 16:00:34 | MouseUp | |
| 21 | 1166535 | 16:00:36 | MouseDown | |
| 22 | 1166535 | 16:00:36 | .. ove | |
| 23 | 1166646 | 16:00:38 | MouseUp | |
| 24 | 1166760 | 16:00:40 | MouseDown | |
| 25 | 1166760 | 16:00:40 | .. dit | |
| 26 | 1166868 | 16:00:42 | MouseUp | |
| 27 | 1167044 | 16:00:45 | MouseDown | |
| 28 | 1167044 | 16:00:45 | .. ype | |
| 29 | 1167090 | 16:00:46 | MouseUp | |
| 30 | 1167163 | 16:00:47 | MouseDown | |
| 31 | 1167163 | 16:00:47 | ..Point | |
| 32 | 1167193 | 16:00:47 | MouseUp | |
| 33 | 1167277 | 16:00:49 | MouseDown | |
| 34 | 1167277 | 16:00:49 | .. tyle | |
| 35 | 1168997 | 16:01:17 | MouseUp | |
| 36 | 1168997 | 16:01:17 | | |
| 37 | 1169181 | 16:01:20 | MouseDown | |

Fig. 6

EVENT CAPTURING FOR COMPUTER SOFTWARE EVALUATION

TECHNICAL FIELD OF THE INVENTION

This invention relates to computer processing, and more particularly to a method for capturing events that occur during operation of a user-interactive application program.

BACKGROUND OF THE INVENTION

A goal of user-interactive computer software is "user friendliness", which that the software should be easy to understand and use. In the most general sense, software includes the instructional materials and documentation for computer programs, as well as the programs themselves.

For purposes of evaluating the user friendliness of software, it is often desirable to know the sequence and timing of the user's activities. These activities are compiled in a user activity log for subsequent analysis.

An example of using an activity log is obtaining timing and efficiency data when making design designs. A prototype might be set up with a keyboard selection system for one test, and a mouse-based selection system for another test. The event log can be examined to determine which selection system is easiest to use.

Another example of using an activity log is for comparing a user's actions against a targeted sequence of events. If instructional materials are being evaluated, judgments about the effectiveness of the materials can be made by comparing an event log against a target sequence of events.

One of the traditional methods for obtaining an activity log is using videotape to observe the actions of the user. A disadvantage of this method is that, after the video is taken it must be observed and processed for purposes of documenting the user's actions. It is difficult to accurately collect all actions, such as mouse clicks and key presses, and relate them to time.

Other methods collect information by intercepting keyboard or mouse signals before they are processed by the computer system or by the application program. A disadvantage of this method is that the data does not include contextual information. For example, a keystroke capture item might indicate that the letter "p" was pressed but would not provide information about whether the user was selecting a menu item or entering text.

A need exists for a method of providing a meaningful record of user activity. Ideally, the method should create the record in real-time, as the user interacts with the computer system, without the need for post-use processing.

SUMMARY OF THE INVENTION

The invention is a method of recording the interactions of a user of a computer system having a graphic user interface. The invention is implemented as software programming that runs simultaneously with the programming with which the user is interacting, and uses system-provided resources to provide context for event. The invention has routines for checking an event log at regular intervals to determine if a user-initiated event has occurred. Events are related to associated objects of the graphic user interface and to the time at which they occurred. The invention provides a record of events, objects, and times, which may be used for subsequent analysis.

A technical advantage of the invention is that it is transparent to the user. Nor does the invention invade the application programming or interfere with system performance, although it collects evaluation data in real time. It may be used with different application programs that use unique menu bar commands.

BRIEF DESCRIPTION OF THE DRAWINGS

FIG. 6 illustrates a portion of an event capture log, such as is provided by the invention.

DETAILED DESCRIPTION OF THE INVENTION

The invention described herein is used with computer systems that are characterized by a graphic user interface, having graphic displays such as menus, windows, and dialogue boxes, which prompt the user to enter data or make selections that control operation of the application. These on-screen representations are treated by the system software as objects. The following description is in terms of the Macintosh series of computer systems, manufactured by Apple Corporation, which has these characteristics. Other computer systems with which the invention could be used include DOS operating system computers executing Windows software, which is manufactured by Microsoft Corporation.

Figure 1:
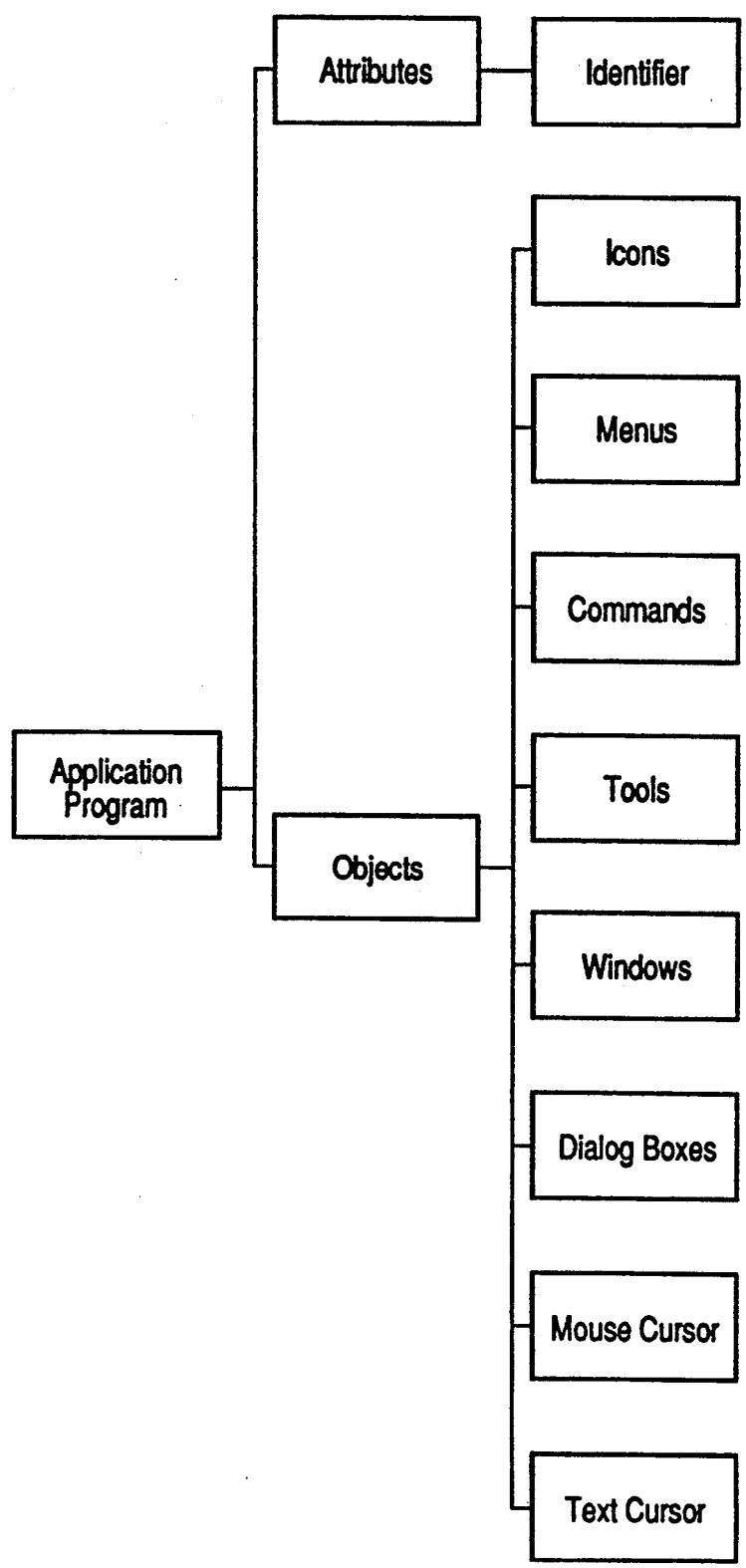
FIG. 1 illustrates the objects associated with an application program.

FIG. 1 illustrates the objects associated with an application program. These objects include icons, menus, commands, tools, file windows, dialogue boxes, the mouse cursor, and the text cursor. The application is also associated with certain attributes, such as its identifier. In the example of this description, the graphic user interface includes a resource file associated with each application program, which identifies and maps the application program's objects.

Figure 2:
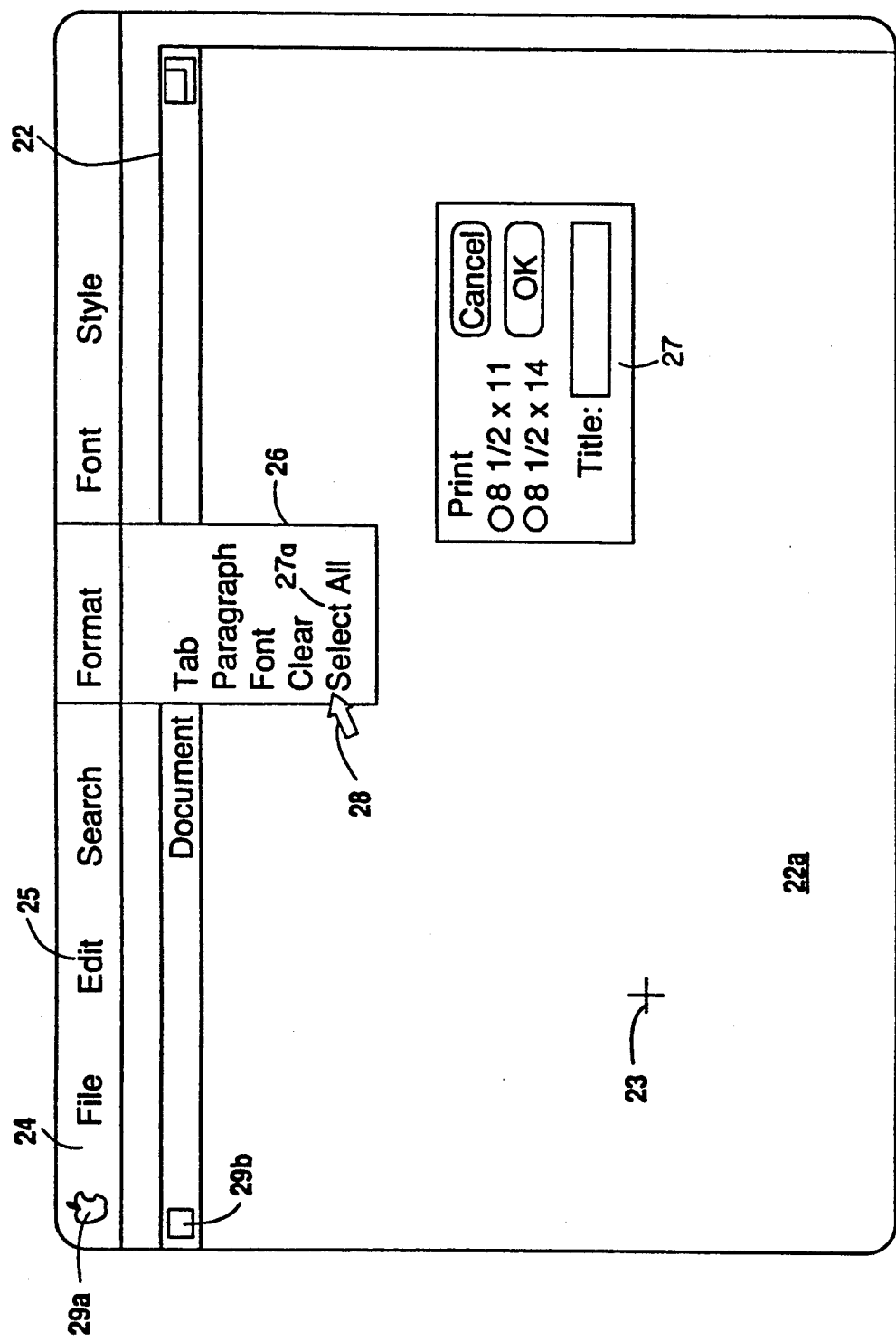
FIG. 2 illustrates a computer screen with a typical display, which displays examples of the objects of FIG. 1.

FIG. 2 illustrates a computer screen 21 with a typical display. The display contains many of the objects listed in FIG. 1. The user enters data or otherwise uses an application program via a window 22. A text cursor 23 in the content region 22a indicates the position of the next character to be entered. A menu bar 24 displays a number of menu titles 25. Each title 25 is associated with a pull-down menu 26. A particular item 27 listed on a menu 26 may call up a dialogue box 27a. A mouse cursor 28 indicates which menu title or menu item will be selected. The "apple" icon 29a represents a particular menu, and is an example of an icon, here used in lieu of a menu title. The close box icon 29b is another example of an icon.

Another characteristic of the Macintosh system is that application programs are driven by events. These events are prioritized by an operating system set of routines known as the Event Manager. An application program may examine each event, determine what type it is, and pass it to an appropriate event handler. The user is the primary generator of events, by interacting with the application program. The application program relates events to objects to determine what actions will be taken by the program.

In essence the invention is a software program that runs simultaneously with a standard application program. It collects event data from system level resources provided by the computer system. The invention transforms the event data into information that is meaningful for software evaluation purposes. The invention specifies the type of events and provides related information, so that timing and screen coordinate information is made meaningful. It generates an event capture log, which can be used for subsequent analysis.

In the preferred embodiment, the invention is written in the C programming language. Other programming languages may be used.

Referring again to FIG. 2, the invention distinguishes among objects, using information about the location of the event. For example, as described below, a selection of a menu 26 is distinguished from drawing in a content area 22a with cursor 23 by determining that the associated event occurred in a menu bar 24 of the computer screen 21.

For purposes of this description, the system level resources used by the invention are those provided by the Macintosh system. However, the invention could also use resources of other computer systems having a graphic user interface, in which screen objects are tracked by events.

Figure 3:
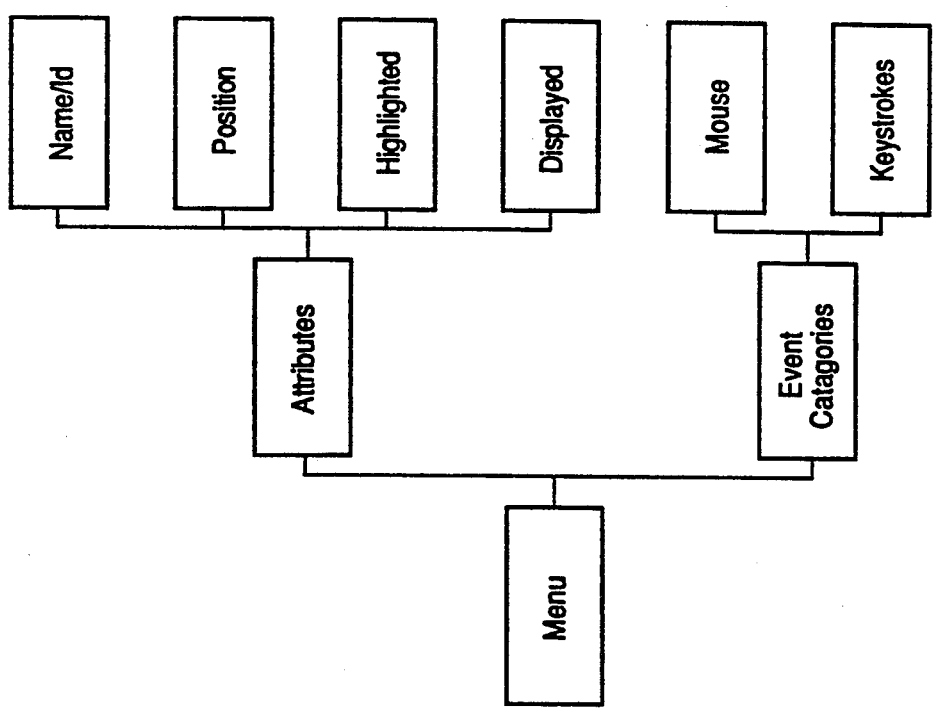
FIG. 3 illustrates the attributes and event categories associated with one of the objects of FIG. 1, in particular, a menu.

FIG. 3 illustrates the attributes and event categories associated with one of the objects of FIG. 1, in particular, a menu. Other objects of FIG. 1 are also associated with attributes and events. Typically, the events will include keystroke events and mouse events, as in FIG. 3.

Figure 4:
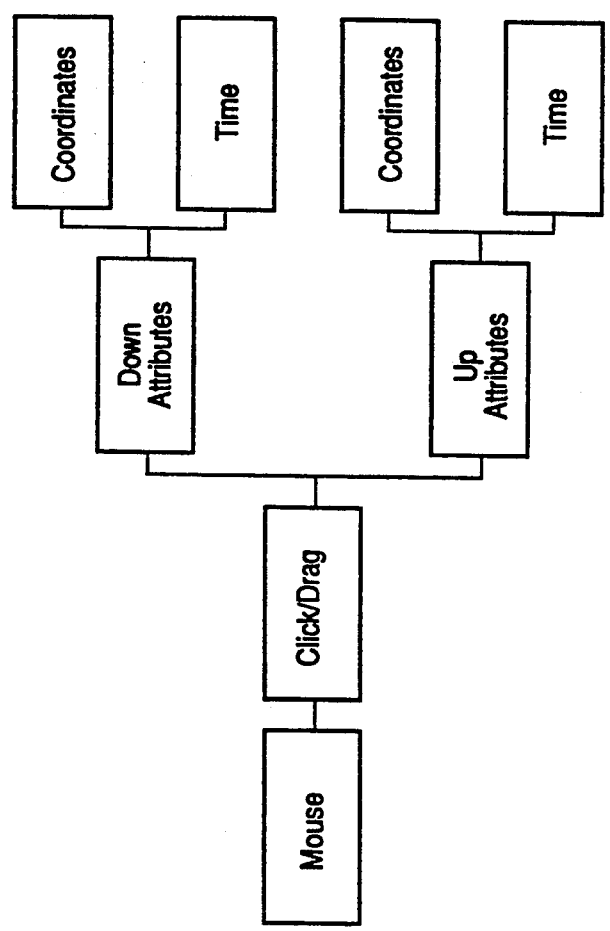
FIG. 4 illustrates the events associated with mouse activity.

FIG. 4 illustrates the events associated with mouse activity. The mouse event may be either a mouse-up or a mouse-down, with each event having time and position attributes.

Figure 5A:
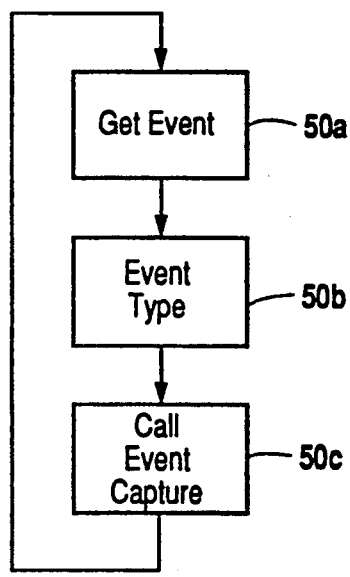
FIG. 5A illustrates the continual event checking routine of the invention.
Figure 5B:
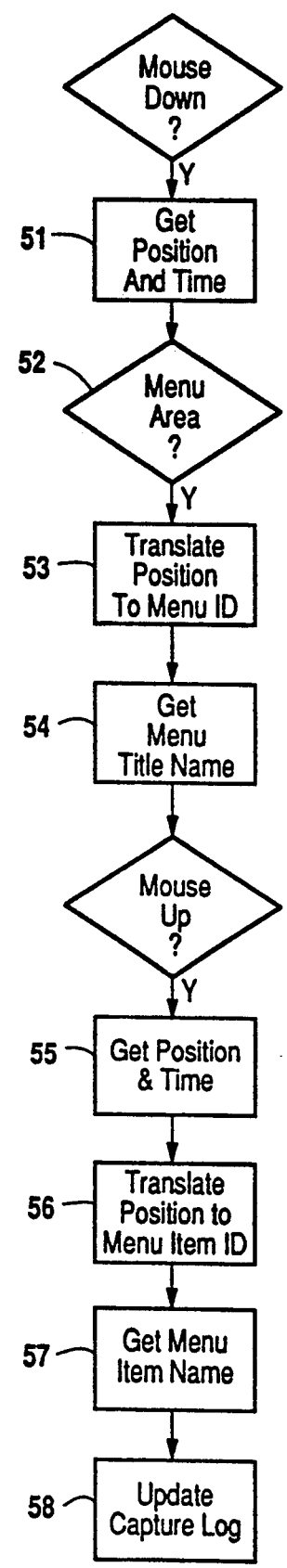
FIG. 5B illustrates an event capture routine, such as is called from the event checking routine of FIG. 5A.

FIGS. 5A and 5B illustrate the operation of the invention. FIG. 5A illustrates the continual event checking routine, and FIG. 5B illustrates an event capture routine, such as is called from the event checking routine of FIG. 5A.

Referring to FIG. 5A, the invention continually checks the system-provided event record to determine when each new event occurs. Thus, like an application program, the invention is event driven. This event record check occurs on every system clock tick, which in the example of this description occurs at 1/60 second intervals. The event record contains all pertinent information about that event. It includes the type of event, the time the event was posted, the location of the mouse, the state of the mouse button, and various additional information, such as which key was pressed or which window was activated.

The specific user-initiated events that are captured by the invention include mouse-down events, which occur when the user presses the mouse button, mouse-up events, which occur when the user releases the mouse button, key-down events, which occur when the user presses a key on the keyboard, and key-up events, which occur when the user releases the key.

Step 50a gets the next event from the event record, step 50b identifies the type of event, and the 5c calls an appropriate event capture routine. As explained below, the particular event capture routine may depend on the object with which the user is currently interacting. Also, if the user changes the currently active window, as determined by data from the event record, pointers to the appropriate object data corresponding to that window can be updated.

FIG. 5B illustrates how the invention captures menu selections. The process illustrated in FIG. 5B is initiated by a mouse-down event, which triggers steps 51-54. The next event, a mouse-up, triggers steps 55-58. Thus, FIG. 5B illustrates a mouse-down event and a mouse-up event and the intervening steps of the programming of the invention, which relate these two events to an object and to time.

If a mouse-down event is detected, step 51 is determining where the mouse-down occurred. The system-provided event record provides this position in terms of x-y pixel coordinates. Movement of the mouse from one location to another is not an event, thus the invention must relate the mouse to on-screen objects using various mapping techniques.

Step 52 is determining whether the mouse-down occurred on a menu bar 24. Referring again to FIG. 2, the menu bar appears in a known area of screen 21. Thus, the x-y coordinates may be used directly to determine if the event occurred there. In the example of this description, the Macintosh system includes a Window Manager, which can be queried to learn in which part of a window a mouse-down event occurred, such as whether it was in a menu bar 24 or on an icon 29a.

If the mouse-down occurred on a menu bar 24, step 53 is translating pixel coordinates to a menu identifier. A feature of the invention is that it provides menu selection information, regardless of the particular application program with which it is used. As shown in FIG. 2, a menu bar 24 has a number of titles 25, each title 25 representing a menu selection, typically a one-word description. Although FIG. 2 illustrates six menu titles for a particular application, such as a word processing program, different applications may use different menu bars having menu titles of different lengths and different numbers of titles. Thus, simply obtaining pixel coordinates does not identify a menu title because the title position is dependent on the application program being used.

To determine menu title selections, the invention makes use of the fact that each character of the alphanumeric character set recognized by the computer system has a constant width in pixels. For example, within the system font of the Macintosh computer, the letter "F" is 7 pixels wide. The invention includes a stored look-up table that lists every character and its width. The sum of the number of pixels for each letter of the first character string determines the right edge of the first menu title. That sum plus one pixel determines the left edge of the second menu title. The sum of pixels in the second menu item plus the left edge pixel coordinate determines the right edge of the second menu title. This counting process can be used to relate pixel coordinates to each menu title position, and is used to determine whether the first, second, third, etc., title has been selected.

Step 54 is using the menu title number determined in step 53 to call a system-provided routine that returns the menu title from the menu item number. As stated above, the event record identifies the currently active window, and this identifier is used to point to a current menu list.

The next sequence of steps occurs when the next mouse-up event is detected. These steps occur so long as the mouse-up occurs within the menu area, as determined by the x-y coordinates provided by the event record. If the mouse-up occurs outside the menu area, a non-selection is logged.

In step 55, the time and pixel coordinates of the event are obtained from the event record.

In step 56, the menu item identifier is determined. This is accomplished by mapping x-y coordinates associated with the event to a menu line number. Each line number is associated with a menu item identifier.

In step 57, the menu item identifier is used to obtain the item name. In the embodiment of this description, this may be accomplished by using the system-provided resource file.

In step 58, the captured information, i.e., the events, the time, and the menu selection, are recorded in an event capture log.

Other events are captured and related to objects in a similar manner. Depending on the type of evaluation being performed, the user's content area data can also be captured. This data may include keystroke entries or mouse activity, i.e., selecting objects, drawing, etc.

Once the type of object is identified, the particular object name can be obtained using a system-provided resource. In the example of this description, these system-provided resources are the various Toolbox routines of the Macintosh operating system.

FIG. 6 illustrates a portion of an event capture log, such as is provided by the invention. Column A lists times, relative to a starting time of the computer system. Column B lists corresponding clock times in clock tick increments. Column C lists events and associated object identifiers. The event capture log may be output in any one of a number of means, including a stored data file a hard copy.

Co-pending U.S. patent application Ser. No. 07/662,047, entitled "Filtering Event Capture Data for Computer Software Evaluation", assigned to the same assignee as the invention of this application, discloses a method of filtering and post-processing the event capture log, and is incorporated herein by reference.

OTHER EMBODIMENTS

Although the invention has been described with reference to specific embodiments, this description is not meant to be construed in a limiting sense. Various modifications of the disclosed embodiments, as well as alternative embodiments will be apparent to persons skilled in the art. It is, therefore, contemplated that the appended claims will cover all modifications that fall within the true scope of the invention.

What is claimed is:

1. A method of evaluating software for a computer system having a graphic user interface, comprising the following steps executed by a computer:
   using a first graphic user interface object to prompt user interaction;
   recording user initiated events in an event record;
   checking said event record at regular intervals to determine when user-initiated events have occurred;
   determining whether said events are associated with said first graphic user interface object;
   relating said events to the time at which the occurred;
   providing a record of said events, objects, and times of said user of the computer systems to said graphic user interface objects;
   repeating each of said steps with respect to a second graphic user interface object; and
   comparing the results of said steps with respect to said first graphic user interface object and results of said steps with respect to said second graphic user interface object to evaluate the software for the computer system.

2. The method of claim 1, wherein said events include mouse events and keyboard events.

3. The method of claim 1, wherein said step of checking an event record occurs according to clock ticks of the computer system clock.

4. The method of claim 1, wherein one of said graphic user interface objects is a menu.

5. The method of claim 4, wherein said step of determining whether said events are associated with said first graphic user interface object and said step of determining whether said events are associated with said second graphic user interface object includes determining a menu title selected from a menu bar by determining the pixel location of the characters of said title.

* * * * *